United States Patent [19]
Higuchi

[11] Patent Number: 6,144,457
[45] Date of Patent: *Nov. 7, 2000

[54] PRINT CONTROL APPARATUS AND METHOD THEREFOR

[75] Inventor: Yuichi Higuchi, Funabashi, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/604,567

[22] Filed: Feb. 21, 1996

[30] Foreign Application Priority Data

Feb. 23, 1995 [JP] Japan ................................ 7-035120

[51] Int. Cl.$^7$ ........................................... G06F 15/00
[52] U.S. Cl. ....................... 358/1.14; 358/1.13; 358/1.15
[58] Field of Search .................. 395/113, 114, 395/112, 110, 117, 109; 358/437, 406, 404; 347/19, 142; 399/8, 9, 16, 17, 18, 19, 20, 21

[56] References Cited

U.S. PATENT DOCUMENTS

| | | | |
|---|---|---|---|
| 5,113,355 | 5/1992 | Nomura | 395/109 |
| 5,220,674 | 6/1993 | Morgan et al. | 395/110 |

*Primary Examiner*—Dov Popovici
*Attorney, Agent, or Firm*—Fitzpatrick, Cella, Harper & Scinto

[57] ABSTRACT

Print control apparatus has a holding unit that hold plural pieces of received print information. If an error during a printing process for one of the plural pieces of print information is detected, it is determined whether the detected error is of a first type or a second type. The printing process of the plural pieces of print information is controlled such that the printing process of any of the plural pieces of print information is interrupted if the detected error is of the first type. If the detected error is of the second type, the printing process is interrupted for the one piece of print information but is continued for another of the plural pieces of print information.

18 Claims, 3 Drawing Sheets

| CAUSE | CONTINUATION OF DATA PROCESSING WITHOUT OPERATOR |
|---|---|
| JAMMING | IMPOSSIBLE |
| NO PAPER | IMPOSSIBLE |
| NO TONER | IMPOSSIBLE |
| NO FONT | POSSIBLE |
| IMPROPER SIZE | POSSIBLE |

PRINT CONTROL APPARATUS AND METHOD THEREFOR

BACKGROUND OF THE INVENTION

1. Field of the Invention

The present invention relates to a print control apparatus provided with plural input ports for receiving print information from plural host computers, a print control method adapted for use in such apparatus, and a memory medium storing a print control program.

2. Related Background Art

In such conventional apparatus with plural input ports, the analysis of the data is executed in the order of reception thereof at the input ports, and, after the completion of analysis of the data received at an input port, there is initiated the analysis of the data received next at another port.

In such conventional configuration, however, if any error occurs in the course of analysis of the data received at first at an input port, the data subsequently received at other input ports remain unprocessed and have to wait until such error is resolved and all the data received at the first input port are processed.

SUMMARY OF THE INVENTION

The present invention, attained for resolving the above-mentioned drawback, is to provide a print control apparatus, a print control method adapted for use in such apparatus, and a memory medium storing a print control program, capable of continuing analysis of the print information even in case of an error in the course of the analysis and then switching to another port for effecting analysis of another print information which has already been received and has been awaiting the processing, thereby enabling prompt switching of the input ports and allowing to immediately initiate the analysis of print information subsequently received from other input ports and suitable for proper output.

In an aspect of the present invention, there is provided a print control apparatus comprising holding means for holding print information received from plural host computers respectively through plural input means for receiving the print information; analysis means for analyzing the print information held in the holding means; detection means for detecting an error in the analysis of the print information by the analysis means; and control means adapted, in case of the detection of an error in the analysis by the detection means, to switch the candidate of the input means subjected to the analysis by the analysis means from the input means currently under analysis to any of other input means awaiting the analysis.

According to another aspect of the present invention, there is provided a print control method adapted for use in a print control apparatus provided with analysis means for holding the print information received from plural host computers respectively through plural input means for receiving the print information and analyzing thus held print information, said method comprising a detection step for detecting an error in the analysis of the print information by the analysis means, and a switching step, in case the error is detected by the detection step, of switching the candidate of the input means to be subjected to the analysis by the analysis means from the input means under current analysis to any of other input means awaiting the analysis.

According to still another aspect of the present invention, there is provided a memory medium adapted for use in a print control apparatus provided with analysis means for holding the print information received from plural host computers respectively through plural input means for receiving the print information and analyzing thus held print information and storing a program comprising a detection step for detecting an error in the analysis of the print information by the analysis means, and a switching step, in case the error is detected by the detection step, of switching the candidate of the input means to be subjected to the analysis by the analysis means from the input means under current analysis to any of other input means awaiting the analysis.

DESCRIPTION OF THE PREFERRED EMBODIMENTS

Figure 1:
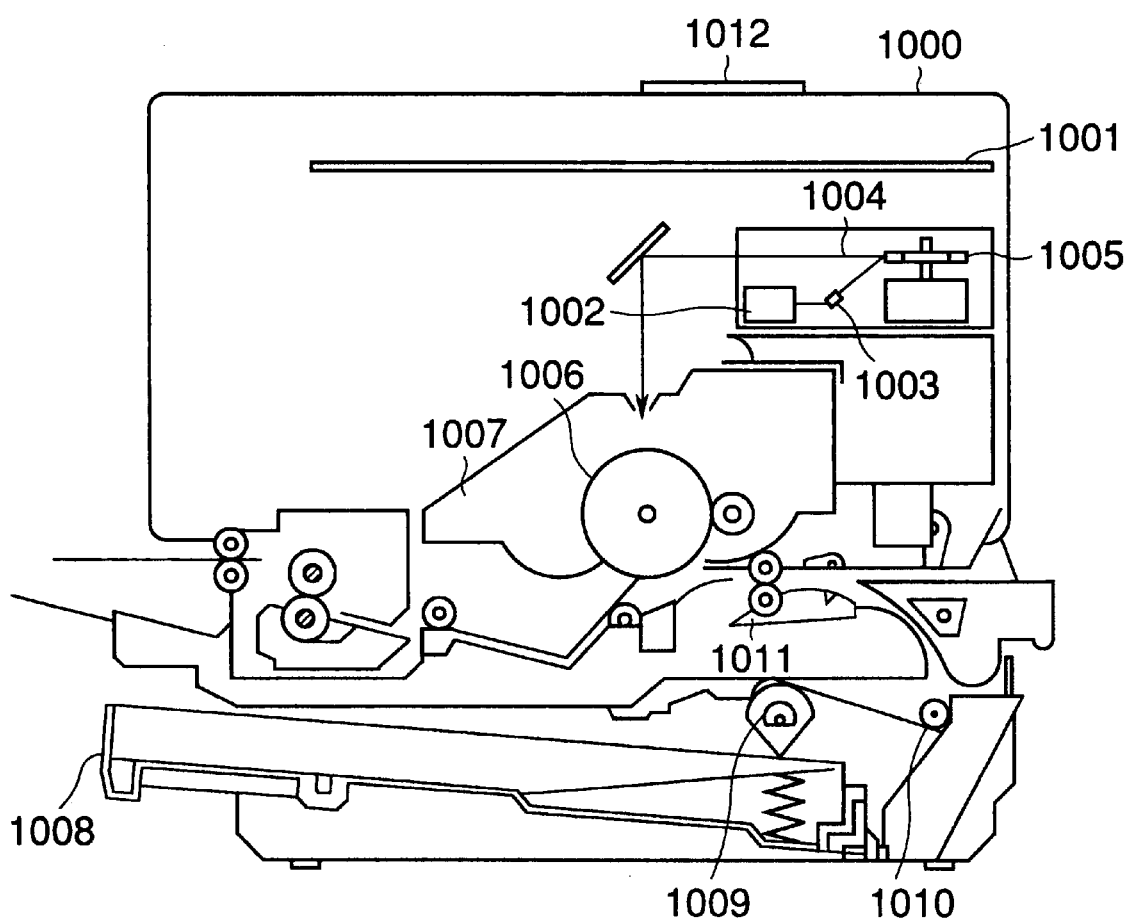
FIG. 1 is a cross-sectional view showing the internal structure of a printing apparatus applied to an embodiment of the present invention.

FIG. 1 is a cross-sectional view showing the internal structure of a printing apparatus applied to an embodiment of the present invention, exemplified by a laser beam printer (LBP) in which character patterns, form data etc. can be registered from an unrepresented data source.

In FIG. 1, a main LBP unit 1000 stores character information (character codes), form information and macro information supplied from externally connected host computers (201, 202, 203 in FIG. 2) and prepares character patterns and form patterns according to such information, thereby forming an image on a recording sheet. There are also shown an operation panel 1012 provided with operation switches and an LED display unit, and a printer control unit 1001 used for the control of the entire LBP 1000 and for the analysis of the character information etc. supplied from the host computers.

The printer control unit 1001 principally converts the character information into a video signal of corresponding character pattern for supply to a laser driver 1002, which drives a semiconductor laser 1003 and effects on-off switching of a laser beam 1004 emitted from the semiconductor laser 1003, according to the entered video signal. The laser beam 1004 is laterally deflected by a rotary polygon mirror 1005 to scan an electrostatic drum 1006.

On the electrostatic drum 1006 there is thus formed an electrostatic latent image of the character pattern, which is developed by a developing unit 1007, positioned around the electrostatic drum 1006, into a visible image which is then transferred onto a recording sheet. The recording sheet, in the form of a cut sheet, is contained in a sheet cassette 1008 loaded in the LBP 1000 and is transported into the apparatus and supplied to the electrostatic drum 1006 by means of a feed roller 1009 and transport rollers 1010, 1011.

Figures 2, 3:
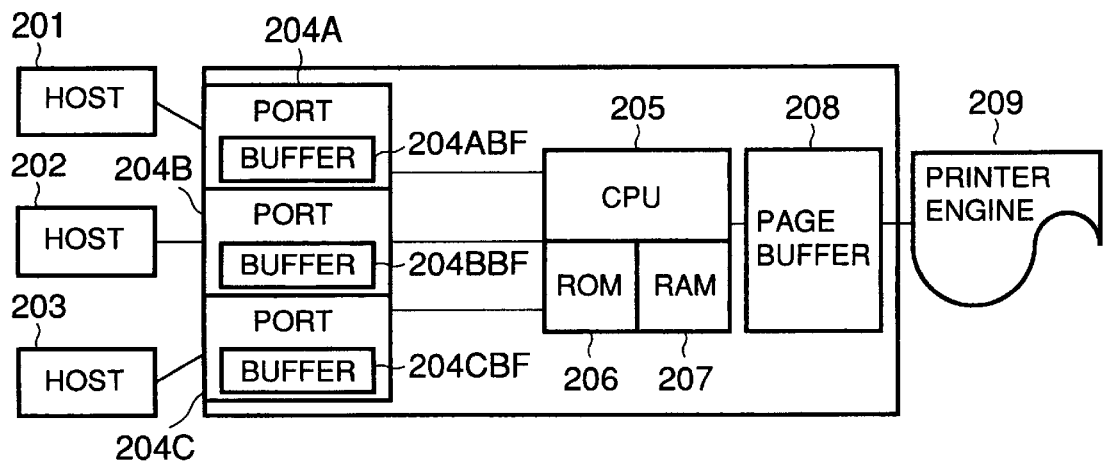
FIG. 2 is a block diagram of the control system of the printer shown in FIG. 1.
FIG. 3 is a chart showing causes of error in the printing apparatus embodying the present invention and whether the process can be continued without the intervention of the operator for each of such cases.

FIG. 2 is a block diagram showing the control system of the printer 1000 shown in FIG. 1 and also showing the relationship between the LBP 1000 and the data sources.

Components 204 to 209 explained in the following are contained in the printer control unit 1001 explained above, and the printer 1000 has the structure as already explained in the foregoing.

In FIG. 2 there are shown host computers 201, 202, 203 constituting data sources; input ports 204A–204C respectively corresponding to the data sources; input buffers 204ABF–204CBF respectively corresponding to the data sources; a CPU 205 controlling the entire printer control unit; a ROM 206 storing programs and font patterns; and a RAM 207 serving as a work area.

There are also provided a page buffer 208 (RAM) for storing developed image data; and a printer engine 209 for effecting the actual printing operation.

A chart in FIG. 3 shows causes of error in the printing apparatus of the present invention and whether the process can be continued, for each cause of error, without intervention by the operator.

In FIG. 3, a column 301 shows the causes of error, such as sheet jamming or absence of toner. A column 302 indicates whether the process continuation is possible without intervention by the operator. For example, the sheet jamming necessitates operation intervention. Absence of font allows process continuation, since the data of other ports can be processed with other fonts. Also improper sheet size allows process continuation, since the data of other ports can be processed if these data utilize the currently available sheet sizes. The errors specific to the data for the printing apparatus of the present embodiment include absence of font, improper sheet size etc.

In the following there will be explained the function of the present embodiment, with reference to FIG. 2 and other drawings.

There are provided holding means (buffers 204ABF–204CBF) for respectively holding the print information received through plural input means (input ports 204A–204C) for receiving the print information from plural host computers, analysis means (CPU 205) for analyzing the print information held in the holding means, detection means (by a function of the CPU 205) for detecting the error in the analysis of the above-mentioned print information by the analysis means, and control means (by a function of the CPU 205) adapted, in case of detection of the error in the analysis by the detection means, to switch the candidate of the input means to be subjected to analysis by the analysis means from the input means currently under analysis to any of other input means awaiting the analysis, wherein the candidate of the input port to be subjected to the analysis is switched from the input port currently under analysis to another input port awaiting the analysis, thereby enabling to initiate the analysis of the print information entered from another input means and awaiting the analysis, prior to the completion of analysis of all the print information received by the currently selected input means.

In the following there will be explained the data processing method in the printing apparatus of the present invention, with reference to a flow chart in FIG. 4.

Figure 4:
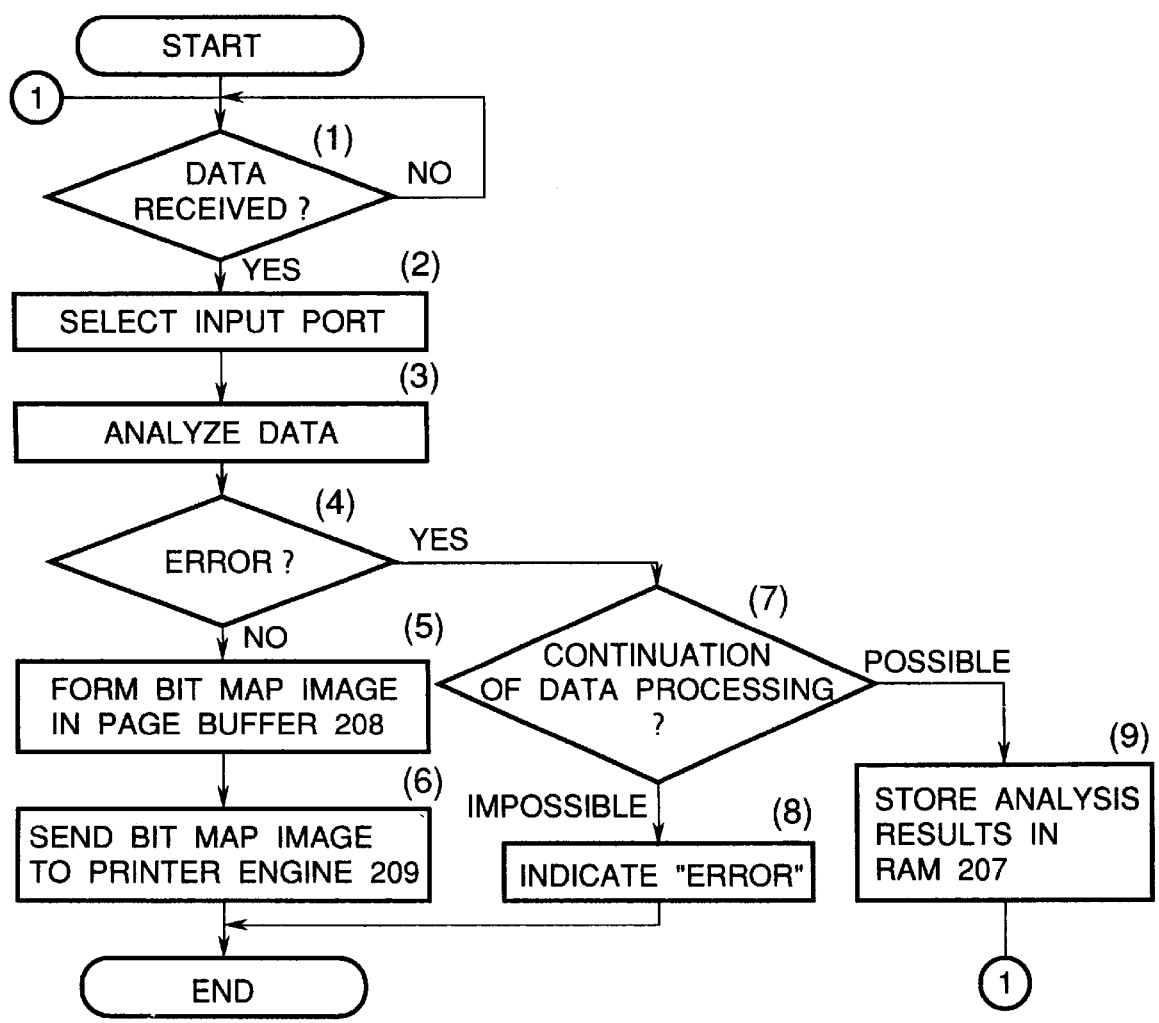
FIG. 4 is a flow chart showing an example of the data processing method in the printing apparatus embodying the present invention.

FIG. 4 is a flow chart showing an embodiment of the data processing method of the present invention, wherein (1) to (9) indicate process steps.

When the power supply is turned on, the CPU 205 discriminates whether data has been received by the input ports from the host apparatus 201–203 (1), and, if not received, repeats the discrimination.

On the other hand, if the step (1) identifies reception of the data, a step (2) effects selection of an input port, and a step (3) effects analysis of the input data, for thereafter processing the data from this port.

Then, in a step (4), the CPU 205 discriminates whether an error has been generated in the analysis, and, in the absence of the error, a step (5) prepares an output bit map (output image) in the page buffer 208 and a step (6) effects data transfer to the engine 209.

On the other hand, if the step (4) identifies generation of an error in the data analysis, the CPU 205 discriminates, in a step (7), whether the data processing can be continued according to the cause of error, by referring to the table shown in FIG. 3.

If the continuation of the data processing is identified not possible for example because of sheet jamming or absence of sheet, a step (8) displays an error message and awaits the intervention of the operator.

On the other hand, if the step (7) identifies that the data processing can be continued, a step (9) stores the content of the current data analysis in a predetermined area of the RAM 207, in order to continue the data processing after the error is resolved.

After the storage of the content of the data analysis, the CPU 205 returns to the step (1) to check whether data has been received at another input port. If data has been received at any of other input ports, the CPU 205 proceeds to the step (2) to effect input port selection and data analysis in the same manner as explained above and then similarly executes the steps (4) to (9).

In the following there will be explained how the present embodiment works, with reference to FIG. 4.

In a print control method for use in a printing apparatus provided with analysis means for holding the print information received respectively through plural input means for receiving the print information from plural host computers, and analyzing thus held print information, there are executed a detection step (step (4) in FIG. 4) for detecting the presence of an error in the analysis of the print information by the analysis means and a switching step (jumping from the step (7) or (9) to (1), (2) in FIG. 4) adapted, in case of the detection of the error in the analysis by the detection step, to switch the candidate of the input means to be subjected to the analysis, from the input means currently under analysis to any of other input means awaiting the analysis, whereby the analysis of the print information entered from another input means and awaiting the analysis can be programmably initiated prior to the completion of analysis of all the print information received from the currently selected input means.

[Other Embodiments]

In the foregoing embodiment, the input ports are selected according to the order of reception of the data, but there may be defined an order of preference for the input ports. Also in the foregoing embodiment, the continuation of data processing is considered impossible in case of absence of the recording sheet, but the table indicating the causes of error and the possibility of continuation of the data processing for each case may be rendered rewritable, since, even in the above-mentioned case, the data processing may be continued in a printing apparatus equipped with multiple feeders, by selecting another sheet feeder. Consequently the user can select or modify the correspondence between the causes of error and the possibility of continuation of the data processing, according to the available resources for printing (resources being different between a printing apparatus with two-side printing mechanism and a printing apparatus with one-side printing mechanism).

The present invention is applicable not only to a system composed of plural equipment but also to an apparatus consisting of a single piece of equipment. It is also applicable to a case in which the present invention is achieved by the supply of a program to a system or an apparatus.

Also in the foregoing embodiment, the interface to be used at each input port is not particularly limited and can be, for example, SCSI, Localtalk, Ethernet, Centronix, RS232C or RS422.

Also each port may be suitably expandable, and the present invention is applicable also to a case where plural standard ports are provided.

According to the foregoing embodiment of the present invention, in case the detection means detects an error in the analysis of the print information by the analysis means, the control means switches the candidate of the input means to be subjected to the analysis by the above-mentioned analysis means from the input means currently under analysis to another input means awaiting the analysis, so that the analysis of the print information entered from another input means and awaiting the analysis can be initiated prior to the completion of analysis of all the print information received from the currently selected input means.

Also according to another embodiment, upon detection of the error in the analysis of the print information by the analysis means, the candidate of the input means to be subjected to the analysis by the analysis means is switched from the input means currently under analysis to any of other input means awaiting the analysis, so that the analysis of the print information entered from other input means and awaiting the analysis can be initiated in a programmable manner, prior to the completion of analysis of all the print information received from the currently selected input means.

What is claimed is:

1. A print control apparatus comprising:
    holding means for holding a plurality of pieces of print information;
    detection means for detecting an error during a printing process of one of the plurality of pieces of print information, and for, when the error is detected, determining whether the detected error is of a first type or of a second type; and
    control means for controlling a printing process of the plurality of pieces of print information such that the printing process is interrupted for any of the plurality of pieces of print information if said detection means determines that the detected error is of the first type, and such that the printing process is interrupted for the one piece of print information but continued for another of the plurality of pieces of print information if said detection means determines that the detected error is of the second type.

2. A print control apparatus according to claim 1, wherein said control means controls the printing process according to the order of receptions of the print information.

3. A print control apparatus according to claim 1, further comprising plural input means for receiving the plurality of pieces of print information, wherein said control means controls the printing process according to an order of priority registered in advance for the input means.

4. A print control apparatus according to claim 1, wherein said detection means determines that the detected error is of the first type if the printing process cannot be continued for any of the plurality of pieces of print information and determines that the detected error is of the second type if the printing process can be continued for another of the plurality of pieces of print information.

5. A print control apparatus according to claim 4, further comprising memory means for storing analysis data of the one piece of print information so as to continue data processing after the detected error is removed if said detection means determines that the detected error is of the second type.

6. A print control apparatus according to claim 4, wherein factors for determining whether the printing process can be continued are arbitrarily settable according to available printing resources.

7. A print control method for use in a print control apparatus including holding means for holding a plurality of pieces of print information, said print control method comprising the steps of:
    detecting an error during a printing process of one of the plurality of pieces of print information, and for, when the error is detected, determining whether the detected error is of a first type or of a second type; and
    controlling a printing process of the plurality of pieces of print information such that the printing process is interrupted for any of the plurality of pieces of print information if said detecting step determines that the detected error is of the first type, and such that the printing process is interrupted for the one piece of print information but continued for another of the plurality of pieces of print information if said detecting step determines that the detected error is of the second type.

8. A print control method according to claim 7, wherein the printing process is controlled in said controlling step according to the order of receptions of the print information.

9. A print control method according to claim 7, further comprising, prior to said detecting step, receiving the plurality of pieces of print information through plural input means, wherein the printing process is controlled in said controlling step according to an order of priority registered in advance for the input means.

10. A print control method according to claim 7, wherein said detecting step determines that the detected error is of the first type if the printing process cannot be continued for any of the plurality of pieces of print information and determines that the detected error is of the second type if the printing process can be continued for another of the plurality of pieces of print information.

11. A print control method according to claim 10, further comprising the step of storing analysis data of the one piece of print information so as to continue data processing after the detected error is removed if said detecting step determines that the detected error is of the second type.

12. A print control method according to claim 10, wherein factors for determining whether the printing process can be continued are arbitrarily settable according to available printing resources.

13. A memory medium for use in a print control apparatus including holding means for holding a plurality of pieces of print information, said memory medium storing a program comprising the processes of:
    a detecting process to detect an error during a printing process of one of the plurality of pieces of print information, and for, when the error is detected, determining whether the detected error is of a first type or of a second type; and
    a control process for controlling a printing process of the plurality of pieces of print information such that the printing process is interrupted for any of the plurality of pieces of print information if said detecting process determines that the detected error is of the first type, and such that the printing process is interrupted for the one piece of print information but continued for another of the plurality of pieces of print information if said detecting process determines that the detected error is of the second type.

14. A memory medium according to claim 13, wherein the printing process is controlled in the control process according to the order of reception of the print information.

15. A memory medium according to claim 13, further comprising, prior to said detecting process, an inputting process to receive the plurality of pieces of print information through plural input means, wherein the printing process is controlled in the control process according to an order of priority registered in advance for the input means.

16. A memory medium according to claim 13, wherein said detecting process determines that the detected error is of the first type if the printing process cannot be continued for any of the plurality of pieces of print information and determines that the detected error is of the second type if the printing process can be continued for another of the plurality of pieces of print information.

17. A memory medium according to claim 16, wherein said program further comprises the process of storing analysis data of the one piece of print information so as to continue data processing after the detected error is removed if said detecting process determines that the detected error is of the second type.

18. A memory medium according to claim 16, wherein factors for determining whether the printing process can be continued are arbitrarily settable according to available printing resources.

* * * * *